US005565231A

United States Patent [19]

Malone et al.

[11] Patent Number: 5,565,231

[45] Date of Patent: Oct. 15, 1996

[54] DISINFECTION OF AQUEOUS SOLUTIONS

[75] Inventors: Joseph W. G. Malone, Liverpool; Robert A. Simms, Warrington; Garry I. Bowler, Norwich, all of United Kingdom

[73] Assignees: Solvay Interox Limited, Warrington; British Sugar PLC, London, both of England

[21] Appl. No.: 481,324

[22] PCT Filed: Jan. 5, 1994

[86] PCT No.: PCT/GB94/00011

§ 371 Date: Aug. 15, 1995

§ 102(e) Date: Aug. 15, 1995

[87] PCT Pub. No.: WO94/16110

PCT Pub. Date: Jul. 21, 1994

[30] Foreign Application Priority Data

Jan. 6, 1993 [GB] United Kingdom .................. 9300243

[51] Int. Cl.$^6$ ................................ A23L 3/34; C02F 1/50

[52] U.S. Cl. .......................... 426/532; 426/425; 426/431; 426/481; 210/764; 210/759

[58] Field of Search .................................... 210/759, 764; 426/321, 326, 531, 532, 425, 431, 481

[56] References Cited

FOREIGN PATENT DOCUMENTS 0456627 11/1991 European Pat. Off. .

OTHER PUBLICATIONS

Chemical Abstracts, vol. 83, No. 18, No. 149459c, Nov. 1975.

Holland, G. et al., "Experiences in the use of biocides for microbiological control in the raw sugar factory", paper presented at Sugartech 1990, Eastbourne, UK, 25–28 Jun. 1990.

*Primary Examiner*—Neil McCarthy
*Attorney, Agent, or Firm*—Larson & Taylor

[57] ABSTRACT

Solutions of sugars obtained during the processing of foodstuffs can be subject to bacterial contamination. In view of the possible legislation to prevent the use of existing disinfectants such as formaldehyde in these conditions, alternative treatments are needed. Effective disinfection of sugar solutions can be achieved employing a peracetic acid solution containing a high mole ratio of hydrogen peroxide to peracetic acid, such as from 18:1 to about 54:1 in combination with a second peracetic acid solution.

13 Claims, No Drawings

DISINFECTION OF AQUEOUS SOLUTIONS

The present invention relates to disinfection and more particularly to the disinfection of aqueous solutions produced during food processing operations or like solutions containing a substantial concentration of nutrients for bacteria.

During the course of industrially processing foodstuffs, in a number of industries there are produced aqueous solutions of for example sugars or like materials capable of acting as nutrients for bacteria, including inter alia Lactobacilli and Thermophilic Bacilli. For example, during the production of sucrose from sugar beet, the sliced beet solids are contacted with an aqueous solution for a lengthy period at elevated temperatures in order to extract the sugars into solution. Bacteria are inevitably introduced into the process on the surface of the sugar beet. Thus, the contact period represents an excellent opportunity for the bacteria to multiply; at less elevated temperatures the Lactobacilli can thrive and at the more elevated temperatures the Thermophilic Bacilli can thrive, thereby forming in situ lactic acid and/or other unpleasant or even toxic contaminants. The sugar solutions are subsequently subjected to purification and crystallisation steps. The sugar industry is fully aware of these potential problems and currently introduce a range of biocides in order to counteract them. These biocides include dithiocarbamates and formaldehyde. Whilst their use has been regarded as effective, questions have been raised as to whether they should be permitted for use in food processing. A further problem with the use of formaldehyde is that it can impart a colouration to the sugar, thus reducing its value and/or increasing the washing amount of washing of the sugar required which increases processing times and can also result in increased loss of sugar. Accordingly, it is desirable to locate an alternative disinfectant system.

One of the areas in the process to produce sucrose from sugar beet into which it is particularly desirable to introduce a biocide is the diffusers, these being the part of the plant where the chopped and washed sugar beets are contacted with extracting liquors To extract the sucrose. The biocide added to this area is known hereinafter as "D solution". Another area into which it is desirable to introduce a biocide is the pressed pulp water recycle system, in which part of the liquor that is extracted from the beets is separated from the beet and recycled back to the diffusers. The biocide added to this area is known hereinafter as "PWC solution".

One class of compounds that have been proposed for use as a disinfectant comprises peroxycarboxylic acids, including peracetic acid. It has been used or proposed to be used as a disinfectant for the sugar processing industry in a paper by Rolf Nystrand in Zuckerind. 110 (1985) Nr 8 pp693–698 entitled "Disinfectants in Beet Sugar Extraction". However, the treatment regime suggested by Nystrand only comprises the use of a single peracetic acid solution having a high mole ratio of hydrogen peroxide to peracetic acid. It has been found in the course of studies leading to the present invention that The use of two different peracetic acid solutions dosed in separate locations gives good, cost effective control of bacterial populations.

According to the present invention there is provided a process for disinfecting aqueous solutions of sugars or like solutions obtained during food processing and containing a significant amount of nutrient for bacteria, characterised in that there is introduced into the pressed pulp water recycle an effective amount of a peracetic acid solution comprising a substantial molar excess of hydrogen peroxide relative to the peracetic acid, and that there is introduced into central fraction of the diffusers an effective amount of a peracetic acid solution that does not comprise a substantial molar excess of hydrogen peroxide relative to the peracetic acid.

The process of the present invention can be carried out most simply by introducing the compositions into the process liquors at the desired process stages in amounts at suitably timed intervals.

In the PWC solution, provided that a substantial molar excess of hydrogen peroxide over peracetic acid is employed, the precise choice of the composition is at the discretion of the user. It is desirable to select a mole ratio of $H_2O_2$:PAA of at least about 12:1 and in practice the mole ratio is normally not higher than about 120:1. In some preferred embodiments the mole ratio is selected in the region of about 18:1 to about 54:1. Although in theory the peracetic acid concentration could be varied through quite a wide range of concentrations, in practice a concentration of at least 0.5% w/w is preferred to minimise the overall volume of peracid composition for transportation and/or storage. Usually, the peracetic acid concentration of up to about 5% w/w is selected, and for convenience and ease of manufacture, the concentration is often from about 2% to about 3% w/w. The hydrogen peroxide in such compositions is often selected advantageously within the range of from about 15% to about 50% w/w.

In especially convenient embodiments, the PWC solutions for use in the present invention can be made by reacting a concentrated hydrogen peroxide solution, often selected from solutions containing from 30 to 65% w/w hydrogen peroxide, and particularly a solution containing nominally 35% w/w with a minor amount of acetic acid or anhydride, such as in a mole ratio of peroxide to acetic acid of about 10:1 to about 30:1 and thereafter permitting the mixture to reach equilibrium. A small amount of a customary stabiliser and/or a strong acid catalyst or a combination of catalyst and stabilisers can be incorporated, including sulphuric acid and an organic phosphonic acid such as ethylenehydroxy-diphosphonic acid typically in an amount of up to about 1 or 1.5% w/w and/or an aromatic hydroxyacid such as dipicolinic acid typically in an amount of up to about 0.5% w/w. The temperature for manufacture of the composition is at the discretion of the producer, and is usually selected in the range of at least about 10° C., taking into account line rate at which it is desired to obtain product from the production unit and whether suitable safety provisions are incorporated in the unit.

The concentration of peracetic acid in the D solution can be selected from a wide range of concentrations, but is often in the range of from about 0.5% to about 40% w/w, and most often between about 4% and about 20% w/w. The concentration of hydrogen peroxide in the D solution is often selected from about 5% to about 30% w/w, but in any event, the mole ratio of hydrogen peroxide to peracetic acid in the D solution is Often selected to be less than about 10:1, and most often less than about 5:1. It will be readily apparent to one skilled in the art that a low mole ratio of hydrogen peroxide to peracetic acid can be achieved by employing a distilled grade of peracetic acid. In the most preferred embodiments, the concentration of peracetic acid is in the range of from about 10 to about 15% w/w, and the concentration of hydrogen peroxide is in the range of from about 15 to about 25% w/w.

The D solution can be prepared in any of the methods known in the art, which generally comprise reacting acetic acid or acetic anhydride solution with hydrogen peroxide Solution, optionally at elevated temperature and in the presence of a strong acid catalyst, together with any desired stabilisers, such as dipicolinic acid and/or., an organic phosphonic acid such as ethylenehydroxy-diphosphonic acid.

The preferred amount of the PWC solution to introduce into the pressed pulp water circuit will naturally depend upon a number of factors, such the levels and frequency of recontamination that occur, the strains of Bacilli which are present and the operating conditions in the food processing process. In general, it is preferred to conduct a series of ranging trials to establish the approximate minimum amount of compositions that should be used. In many circumstances encountered to date, PWC solution is introduced into the process liquors or like solutions to provide a peracid concentration up to about 100 ppm, and preferably it is selected in the range of at least 5 ppm and often up to about 50 ppm, ie preferably from about $6.5\times10^{-5}$M to about $6.5\times10^{-}$M. The D solution is introduced into the diffuser to provide a peracid concentration in the liquors up to about 500 ppm, and preferably it is selected in the range of at least 25 ppm and often up to about 350 ppm.

The invention process can be carried out over a wide range of operating temperatures, from ambient operating temperatures, which may be as low as 5° C. up to about 90° C. Consequently, the invention process is well suited to incorporation in conventional processes for extracting sugars from sugar beet. In such processes, sugar beet roots are washed, sliced, and contacted with extracting steam/water. In all processes variations, a substantial fraction of the sugars are extracted under controlled temperature and pH conditions in a continuously operated diffuser, generally conducted with the macerated beet passing in a counter-current fashion to the extracting liquor. In such processes, a temperature gradient is conventional, ranging from about 40–50° C. up to about 75/80° C. In some variations, a prescalder is employed for the initial contact, which in which the operating temperature often averages about 40° C. The extracting liquors are typically recirculated to at least some extent between stages in the diffuser, and the overall retention time of liquor in the diffuser is often several hours during which any bacteria which had survived the initial shock from contact with peracetic acid could multiply in the absence of residual biocide or biostat.

The PWC solutions are dosed into the portion of the diffuser liquors comprising the recycled liquors from the presses, most preferably after this liquor has been screened to remove any fine particulate matter.

The D solutions are introduced into the central fraction of the diffusers. In many practical instances, the fraction comprises approximately one third of the length of the diffusers, i.e. measuring from the liquor outlet, the D solution is dosed at a location not less than one third, and not more than two thirds, of the length of the diffuser. Preferably, the dosing is located in a position such that the effective lifetime of the peracetic acid is not less than to the time for the liquor to flow from the dosing location to the outlet. The effective lifetime of peracetic acid is the time taken for the peracetic acid concentration to reduce to a concentration at which it is substantially biocidally inactive.

If desired, a peracetic acid composition can additionally be introduced into the aqueous pulp in the pre-scalder, but in many cases, this will not be necessary.

By the use of the process according to the present invention, it is possible to control the growth of both Lactobacilli and Thermophilic Bacilli, which tend to thrive at different stages of the sugar extraction process, using the same (i.e. peracetic acid-containing) disinfectant. This simplifies the number of different treatment agents that need be employed in the process.

The process according to the present invention can also result in the production of sugar having an increased whiteness before washing compared with the situation where certain alternative disinfection regimes are employed, thereby reducing the amount of washing required to produce sugar of the desired whiteness. For, good whiteness it is desirable to employ peracetic acid concentrations of at least 5 ppm in the pressed pulp water circuit and at least 25 ppm in the diffuser.

Having described the invention in general terms, the effectiveness of specific embodiments thereof will be demonstrated by the Examples below.

EXAMPLE 1

The trial was carried out on a sugar beet processing line.

A solution of peracetic acid comprising 3% w/w peracetic acid and 30% w/w hydrogen peroxide was continuously dosed into the pressed pulp water circuit after the liquor had been screened to remove particulate matter. The concentration of peracetic acid employed was 11 ppm. A second solution of peracetic acid, commercially available from Solvay Interox Ltd under their Trade Mark PROXITANE comprising 12% w/w peracetic acid and 20% w/w hydrogen peroxide, was shock dosed at a concentration of 210 ppm peracetic acid into the diffusers, and thereafter maintained at a concentration of 130 ppm peracetic acid by dosing for 10 minutes every three hours. The second peracetic acid solution Was dosed into the seventeenth bay of a diffuser comprising 34 bays in total.

The dosing into the pressed pulp water circuit resulted in an average of a 3 log reduction in the microbial contamination of this circuit. The lactic acid concentration in the raw sugar from the diffuser was controlled to below 100 ppm lactic acid.

EXAMPLE 2

The procedure of Example 1 was followed, except that the peracetic acid solution dosed into the pressed water circuit was dosed on a one hour on, one hour off basis.

Both of these treatment regimes were found to give effective control of the bacterial population in the process liquors, and gave acceptably low conversions of sucrose to lactic acid and acceptable product colouration.

We claim:

1. In a process of recovering sugar from sugar beet which comprises:

contacting sugar beet with water in a diffuser to produce beet pulp and an aqueous sugar solution, pressing the beet pulp to produce pressed beet pulp and pressed pulp water, recycling at least a portion of the pressed pulp water to the diffuser, and introducing a disinfecting amount of a disinfectant into the sugar solution, the improvement in*which the step of introducing a disinfectant into the sugar solution comprises:

introducing into the recycled portion of the pressed pulp water a disinfecting amount of a peracetic acid solution having a mole ratio of hydrogen peroxide to peracetic acid of at least 12:1; and introducing into the aqueous sugar solution in the diffuser a disinfecting amount of a peracetic acid solution having a mole ratio of hydrogen peroxide to peracetic acid of less than 10:1.

2. A process according to claim 1, wherein the peracetic acid solution introduced into the pressed pulp water has a mole ratio of hydrogen peroxide:peracetic acid of from about 12:1 to about 120:1.

3. A process according to claim 1, wherein the peracetic acid solution introduced into the pressed pulp water has a mole ratio of hydrogen peroxide:peracetic acid of from about 18:1 to about 54:1.

4. A process according to claim 1, wherein the peracetic acid solution introduced into the diffuser has a mole ratio of hydrogen peroxide:peracetic acid less than about 5:1.

5. A process according to claim 1, wherein the concentration of peracetic acid in the solution introduced into the pressed pulp water is from about 0.5% w/w to about 5% w/w.

6. A process according to claim 1, wherein the concentration of peracetic acid in the solution introduced into the pressed pulp water is from about 2% w/w to about 3% w/w.

7. A process according to claim 1, wherein the concentration of peracetic acid in the solution introduced into the diffuser is from about 0.5% w/w to about 40% w/w.

8. A process according to claim 1, wherein the concentration of peracetic acid in the solution introduced into the diffuser is from about 4% w/w to about 20% w/w.

9. A process according to claim 1, wherein the concentration of peracid in the pressed pulp water circuit is up to about 100 ppm.

10. A process according to claim 1, wherein the concentration of peracid in the pressed pulp water circuit is from about 5 ppm to about 50 ppm.

11. A process according to claim 1, wherein the concentration of peracid in the aqueous sugar solution in the diffuser is up to about 500 ppm.

12. A process according to claim 1, wherein the concentration of peracid in the aqueous sugar solution in the diffuser is from about 25 ppm to about 350 ppm.

13. In a process of recovering sugar from sugar beet which comprises contacting sugar beet with water to produce beet pulp and an aqueous sugar solution, and introducing a disinfecting amount of a disinfectant into the sugar solution, the improvement wherein said introducing a disinfecting amount of a disinfectant comprises separately introducing in separate locations two different solutions comprising peracetic acid.

* * * * *